(No Model.)
F. DOUGLAS.
PNEUMATIC TIRE.
No. 496,642.   Patented May 2, 1893.
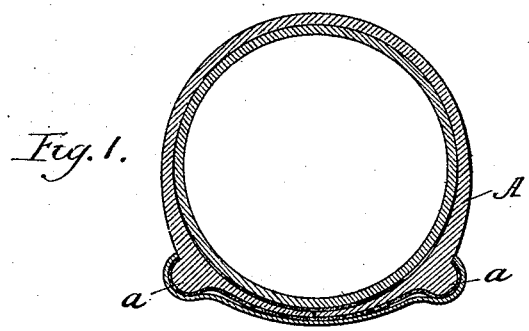
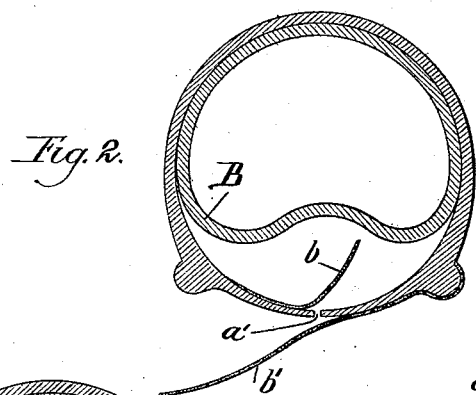
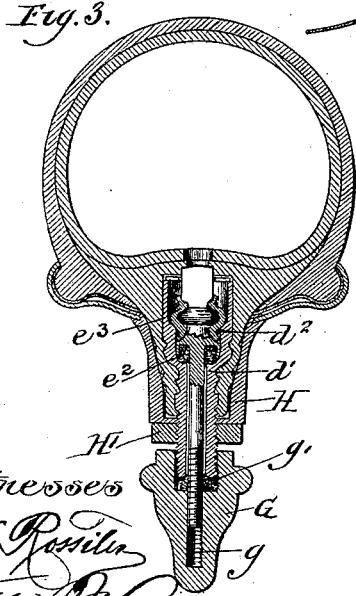
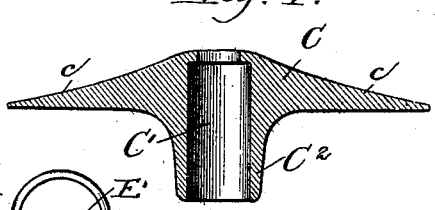
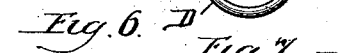
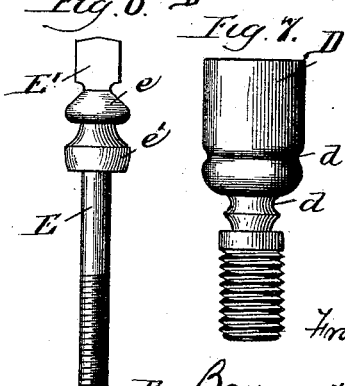
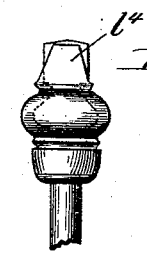
Witnesses
W. Rossiter
Chas. T. Sheridan
Inventor
Frank Douglas,
By Banning & Banning & Payson,
Attys.
THE NORRIS PETERS CO., PHOTO-LITHO., WASHINGTON, D. C.

UNITED STATES PATENT OFFICE.

FRANK DOUGLAS, OF CHICAGO, ILLINOIS.

PNEUMATIC TIRE.

SPECIFICATION forming part of Letters Patent No. 496,642, dated May 2, 1893.

Application filed June 7, 1892. Serial No. 435,856. (No model.)

*To all whom it may concern:*

Be it known that I, FRANK DOUGLAS, a citizen of the United States, residing at Chicago, Illinois, have invented certain new and useful Improvements in Vehicle-Tires, of which the following is a specification.

The object of my invention is to provide means for a more ready insertion and removal of the inner tube of pneumatic bicycle tires, and improved means for inflating and deflating such tires; and my invention consists in the features and details of construction hereinafter described and claimed.

In the drawings, Figure 1 is a transverse section of a bicycle tire as the same appears when attached to the rim. Fig. 2 is a transverse section of a tire showing the arrangement of the outer tube for the insertion and removal of the inner tube. Fig. 3 is a transverse section of a tire taken through the valve for inflating and deflating it; and Figs. 4, 5, 6, 7 and 8 are details which will be hereinafter described and claimed.

In making a pneumatic bicycle tire, I make what I will term an outer casing A, of the desired size and length. This outer casing is preferably molded with longitudinal lugs or ledges $a$, of a size and shape to fit the grooves or channels of the rim of the wheel with which they are intended to be used, and it is made thicker along and near the line of these lugs or ledges, as shown in the drawings. This outer casing is provided with a longitudinal slit $a'$, extending preferably the entire length of the case, so that it may be opened out to enable a continuous inner tube B to be inserted into or removed from it. To provide means for closing the slit after the inner tube has been inserted, and to add additional strength to the outer casing, I arrange an inner flap $b$, the length of the outer casing, and cement it to the inside along one edge, and an outer flap $b'$ cemented on the outside of the case at one edge. The position and arrangement of these flaps to permit the outer casing to be opened is clearly shown in Fig. 2. After the inner tube has been inserted, the free edges of the flaps can be cemented to the outer casing, so as to entirely overlap and close the slit, previous to applying the tire to the rim of the wheel. The position of these flaps, after their free edges have thus been cemented in place, will be readily understood by an examination of Fig. 1.

When it is desired to open the slit to remove the inner tube, the tire may be removed from the rim of the wheel, and one edge of each flap loosened or peeled up from the outer tire, as shown in Fig. 2, when the outer tire may be opened longitudinally and the inner tube removed or repaired as may be desired. In order to inflate and deflate the inner tube with air, I arrange a valve opening into it at any desired point. In making and applying this valve, I make what I term a valve casing C, of soft rubber, and preferably of the disk form shown in Fig. 4. This valve casing is intended to be cemented to the outer side of the tube, at the proper point throughout its surface $c$ to securely attach it to the inner tube. The valve casing C is provided with a recess $C'$, of the proper size to receive the valve seat tube, in connection with which it is intended to be used. This valve seat tube D is made of metal, vulcanite, or other suitable material, and is preferably provided on the outside with annular grooves or channels $d$, and when it is inserted into the recess of the valve casing, the neck, $C^2$, of the valve casing, which receives it, is intended to be tied or otherwise securely fastened to the valve seat tube at the annular grooves or channels. In Fig. 3 it is shown as thus connected to the valve seat tube, so as to conform to its external shape. The valve seat tube is preferably provided with two internal shoulders $d'$, $d^2$, to form what I will term primary and secondary valve seats. The outer end of the valve seat tube extends beyond the valve casing, and is provided with screw threads at its outer end, as shown in Figs. 3 and 7. I make a valve stem E, provided with a knob $e$, and with an annular cup $e'$. The cup is intended to receive and retain by the inbending of its edge an annular packing $e^2$, shown in Fig. 3, and the knob is intended to receive or have drawn over it a soft rubber tube $e^3$, to form what I would term primary and secondary valves. This rubber tube may either be sprung over the knob $e$ or tied or otherwise secured to it, so as to conform to its shape, as shown in Figs. 3 and 8. It is provided with inwardly extending flaps $e^4$, which have their inner edges about the length of the inner extension $E'$ of the stem, as shown in Fig. 8. This inner extension of the stem is made flat, as shown particularly in Figs. 5 and 6, and a washer F, provided with a rectangular slot or opening through it, is arranged and fastened on the inner end of the valve seat tube, with the flat end of the valve stem extending through it, as shown in Fig. 3, to guide and hold it in proper position. The washer being fastened in the inner end of the valve seat tube also holds the valve stem from turning around, and affords a seat against which the flaps $e^4$ abut when the stem is pushed in. They thus operate as a spring to force the valve stem out when released from pressure, and against the valve seats. When thus forced out, the primary and secondary valves rest against the primary and secondary valve seats, preventing any possible loss or escape of air. The outer end of the valve stem E is threaded as shown in Figs. 3 and 6, and a cap G is provided with a hole $g$, threaded to receive the outer end of the valve stem. This cap is provided with a packing $g'$, against which the end of the valve seat tube rests when the cap is on. By screwing the cap on, the valve stem is drawn out, and the primary and secondary valves drawn the more securely against the primary and secondary valve seats. When it is desired to inflate the tube, the cap is removed and a pump screwed on to the threaded end of the valve seat tube, and air pumped in between the valve stem and its holder, which is made sufficiently large for the purpose. The pressure of the air forces the valve stem in, lifting the primary and secondary valves from the primary and secondary valve seats to allow the air to pass and enter the inner tube around the flat inner extension $E'$ of the valve stem. In thus forcing in the valve stem to admit the air, the flaps $e^4$ are compressed against the washer F, so that the instant pressure is relieved, they, with the pressure of the air, will force the valve stem out and bring the valves snugly against their seats. After sufficient air has been introduced to inflate the inner tube to the desired extent, the pump is removed and the cap again restored to place.

In order to deflate the tire, all that is necessary is to remove the cap and press with the finger or other means on the outer end of the valve stem, so as to lift the valves from their seats, when the air will immediately pass from the tube. At the point where the valve casing is located, there is of course a hole through the wheel rim through which it extends. In order to strengthen the rim at this point, and to afford a protection to the valve casing, I arrange a protecting case H, which is made preferably of metal, and of a size and shape to receive the valve casing. The inner end of this protecting case is firmly and securely attached to the wheel rim around the hole through which the valve casing extends. The outer end of the protecting case is closed, leaving simply a hole large enough to permit the outer end of the valve seat tube to extend through it. As before explained, this outer end is screw-threaded, and a nut $H'$ is screwed on to the end and up against the end of the protecting case. This serves to draw the valve seat tube and the valve casing tightly and securely into the protecting case, which is preferably made tapering, as shown in the drawings, so that the valve casing will be tightly wedged, as it were, to prevent the possible escape of air around it.

What I regard as new, and desire to secure by Letters Patent, is—

1. In bicycle tires, the combination of an inner tube, an outer casing slitted longitudinally to permit insertion and removal of the inner tube and provided with longitudinal lugs molded integral therewith to receive a wheel rim, and an outer strip extending from the outer edges of the lugs across the portion to be included in the rim and forming when cemented a continuous tube, substantially as described.

2. In bicycle tires, a valve for inflating and deflating the tire comprising a valve casing, a valve seat tube arranged therein and provided with primary and secondary valve seats, and a valve stem provided with primary and secondary valves, substantially as described.

3. In bicycle tires, a valve for inflating and deflating the tire comprising an outer protecting case attached to the wheel rim, a valve casing therein and attached to the inner tube, a valve seat tube arranged in the casing and provided with a valve seat, and a valve stem arranged in the valve seat tube and provided with a valve, substantially as described.

4. In bicycle tires, a valve for inflating and deflating the tire comprising a valve casing, a valve seat tube arranged therein and provided with a valve seat, a valve stem provided with a valve, and a cap screwing on to the end of the valve stem to draw the valve against its seat, substantially as described.

5. In bicycle tires, a valve for inflating and deflating the tire comprising a valve casing, a valve seat tube arranged therein and provided with primary and secondary valve seats, and a valve stem provided with a recessed cup and a knob packed and covered respectively to form primary and secondary valves, substantially as described.

6. In bicycle tires, a valve for inflating and deflating the tires comprising a valve casing, a valve seat tube arranged therein and provided with a valve seat, a valve stem provided with a valve and an angular inner end, and a washer secured in the inner end of the valve seat tube provided with an angular hole or opening through which the end of the stem passes and by which the stem is prevented from turning, substantially as described.

FRANK DOUGLAS.

Witnesses:
  THOMAS A. BANNING,
  SAMUEL E. HIBBEN.